US008868815B2

United States Patent
Iino et al.

(10) Patent No.: US 8,868,815 B2
(45) Date of Patent: Oct. 21, 2014

(54) INFORMATION PROCESSING DEVICE AND METHOD

(71) Applicants: Susumu Iino, Tokyo (JP); Kiyoyasu Maruyama, Tokyo (JP); Kenji Esumi, Tokyo (JP)

(72) Inventors: Susumu Iino, Tokyo (JP); Kiyoyasu Maruyama, Tokyo (JP); Kenji Esumi, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 230 days.

(21) Appl. No.: 13/661,130

(22) Filed: Oct. 26, 2012

(65) Prior Publication Data

US 2013/0227320 A1 Aug. 29, 2013

(30) Foreign Application Priority Data

Feb. 24, 2012 (JP) ................................. 2012-038192

(51) Int. Cl.
*G06F 13/38* (2006.01)
*G06F 3/06* (2006.01)

(52) U.S. Cl.
CPC ............ *G06F 13/387* (2013.01); *G06F 3/0661* (2013.01)
USPC ....................................................... 710/315

(58) Field of Classification Search
CPC ... G06F 3/0661; G06F 13/385; G06F 13/387; G06F 13/4027
USPC ........................................................ 710/315
See application file for complete search history.

(56) References Cited

U.S. PATENT DOCUMENTS

| 7,073,008 | B2 * | 7/2006 | Wu et al. ........................ 710/306 |
| 8,606,985 | B2 * | 12/2013 | Kozato et al. ................. 710/315 |
| 2005/0235171 | A1 | 10/2005 | Igari |
| 2006/0069820 | A1 | 3/2006 | Lee et al. |
| 2010/0023669 | A1 * | 1/2010 | Lee ................................ 710/301 |
| 2010/0228885 | A1 * | 9/2010 | McDaniel ......................... 710/5 |

FOREIGN PATENT DOCUMENTS

| JP | 2005-78514 A | 3/2005 |
| JP | 2005-166097 A | 6/2005 |
| JP | 2005-235025 A | 9/2005 |
| JP | 2006-92521 A | 4/2006 |
| JP | 2008-97367 A | 4/2008 |
| JP | 2008-269222 A | 11/2008 |
| JP | 2009-32011 A | 2/2009 |

* cited by examiner

*Primary Examiner* — Glenn A Auve
(74) *Attorney, Agent, or Firm* — Birch, Stewart, Kolasch & Birch, LLP

(57) ABSTRACT

An information processing device including a reader unit connected through a connection switch to a first control section and a second control section. The first control section is connected to the connection switch by a first bus supporting a first specification. The second control section is connected to a conversion unit by a second bus supporting a second specification. The conversion unit is connected to the connection switch by a third bus supporting the first specification. When the connection switch connects the reader unit to the first control section, the second control section halts communication with the conversion unit, thereby avoiding unnecessary use of processing resources.

14 Claims, 6 Drawing Sheets

INFORMATION PROCESSING DEVICE AND METHOD

BACKGROUND OF THE INVENTION

1. Field of the Invention

The present invention relates to an information processing device and method.

2. Description of the Related Art

There is an increasing diversity in the formats of the video data that video reproduction devices are called on to reproduce. There are also devices, such as automotive navigation devices, that must be able not only to reproduce video data but also to rip audio data extracted from a compact disc (CD), and to display map data and video data from a camera. One way to provide these varied functions is to configure the processing control section of the device with a separate system on a chip (SoC) as a processing controller for each function. Devices with different combinations of functions can then be configured in a flexible manner by using as processing controllers a plurality of SoCs which have different functions respectively. Each SoC has a host unit for a bus that connects to an external media reader for reading data from external recording media.

In a device using this type of multiple-SoC processing control, the frequency of access to the external media reader varies from one SoC to another, depending on the function supported by the SoC.

For example, automotive navigation functions normally operate on an internal hard disk drive (HDD) or solid state drive (SSD), and need to access an external media reader such as an optical disc drive only infrequently, to update the data on its internal drive or to load additional data such as compressed audio data. In contrast, reproduction functions of a digital versatile disc (DVD) or Blu-ray disc (BD) frequently require connection to an optical disc drive.

A device that includes both an SoC for automotive navigation functions and an SoC for reproduction functions of optical discs can therefore read external media efficiently and economically by using a single optical disc drive for both purposes.

In Japanese Patent Application Publication No. 2005-235025, Hirose describes a configuration of this type, in which a single external media reader is shared by a plurality of host units by the use of a bus switch. When the host unit in one processing controller is connected to the bus through the bus switch, the host units in the other processing controllers are disconnected from the bus. A precondition for this configuration is that all host units must use the same bus specification, such as the conventional Advanced Technology Attachment (ATA) specification.

The serial ATA bus which is the next generation bus of the ATA bus has come into wide use. Compared with the conventional ATA bus, the serial ATA bus has the advantages of fewer signal lines and a higher data transfer rate. For these reasons, some automotive navigation devices incorporate an SoC having a host unit that supports only the serial ATA specification. When this type of SoC is combined with an SoC having a host unit that supports only the conventional ATA specification, the configuration taught by Hirose cannot be used.

A possible solution is to use a bridge to convert between ATA bus signals and serial ATA bus signals, as taught by Matsuda in Japanese Patent Application Publication No. 2009-032011. If the bridge taught by Matsuda is added to the configuration taught by Hirose, however, further problems arise.

A general problem is the increased cost of the circuit board and components used for video reproduction. A serial ATA bus transfers data at a rate of 1.5 gigabits per second. A circuit board with a data channel operating at this fast rate requires high-precision mounting techniques, and the bus switch which is included in the data channel must be a high-speed integrated circuit (IC). Advanced board design technology is also required. All of this is expensive.

Another problem with this scheme is that it can lead to unnecessary communication. If the bridge taught by Matsuda is inserted between a host unit and the bus switch taught by Hirose, for example, then the host unit remains electrically connected to the bridge even when the bridge is disconnected from the external media reader by the bus switch. In this situation, the serial ATA specification requires the host unit to transmit polling signals repeatedly to try to establish a connection with the external media reader. When the bridge is disconnected from the external media reader by the bus switch, such repeated polling serves only to waste processing resources and slows down the operation of the processing control section.

SUMMARY OF THE INVENTION

An object of the present invention is to prevent wasteful use of resources.

Another object of the invention is to minimize the increased device cost attending the addition of a high-speed bus.

The invention provides an information processing device including a first bus supporting a first specification, a second bus supporting a second specification, a third bus supporting the first specification, a reader unit for reading information from a recording medium, and a connection switch through which the first and third buses are switchably connected to the reader unit. A conversion unit interconnects the second and third buses, converts incoming signals conforming to the first specification to outgoing signals conforming to the second specification, and converts incoming signals conforming to the second specification to outgoing signals conforming to the first specification. A first control section of the information processing device communicates with the reader unit through the first bus and the connection switch. A second control section of the information processing device communicates with the reader unit through the second bus, the conversion unit, the third bus, and the connection switch. When the first bus is connected to the reader unit through the connection switch, the second control section halts communication with the conversion unit.

The halting of communication with the conversion unit may be effected by halting the supply of power to the conversion unit, or by disabling a host unit in the second control section. The host unit may be disabled by unloading a driver that controls the host unit.

Wasteful use of resources is prevented because the second control section does not attempt to communicate with the conversion unit when it cannot communicate with the reader unit because the reader unit is connected to the first bus.

When the first and third buses are comparatively low-speed buses and the second bus is a comparatively high-speed bus, the increased cost attending the use of the second bus can be minimized by minimizing the length of the second bus.

DETAILED DESCRIPTION OF THE INVENTION

Figure 1:
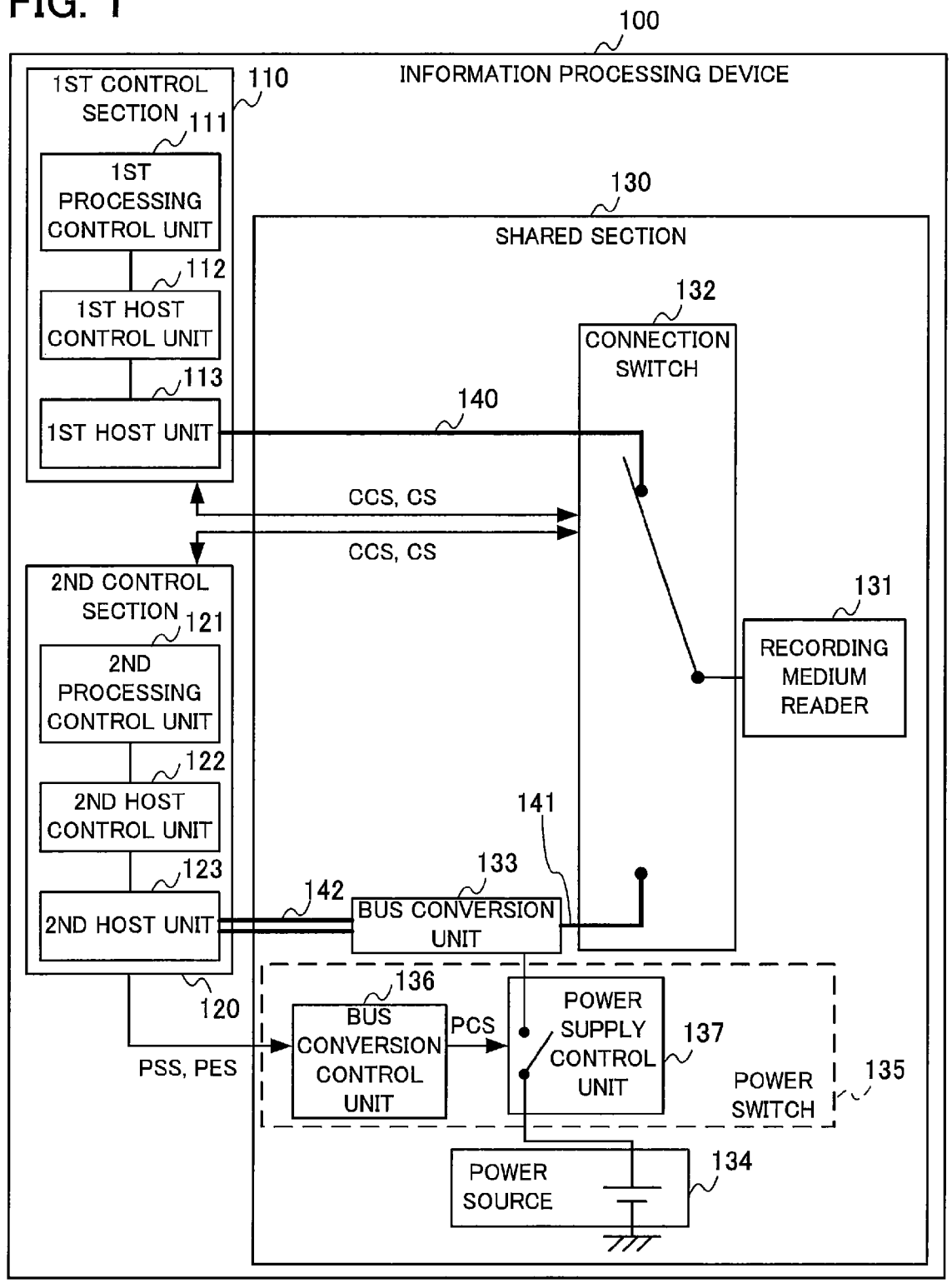
FIG. 1 is a block diagram schematically showing the structure of an information processing device according to a first embodiment of the invention.

Embodiments of the invention will now be described with reference to the attached drawings, in which like elements are indicated by like reference characters.

First Embodiment

Referring to FIG. 1, the information processing device 100 in the first embodiment includes a first control section 110, a second control section 120, and a shared section 130. The first and second control sections 110, 120 have predetermined processing functions.

The first control section 110 comprises, for example, a reproduction SoC that controls the reproduction of audio and video data stored on a recording medium. The first control section 110 includes a first processing control unit 111, a first host control unit 112, and a first host unit 113.

The first processing control unit 111 uses the shared section 130 to carry out predetermined processing such as reproducing audio and video data.

The first host control unit 112 controls the first host unit 113. The first host control unit 112 may be implemented as, for example, driver software with which the first processing control unit 111 controls the first host unit 113.

The first host unit 113 is an interface unit (host adapter) for connecting to a bus that supports a first specification. In the first embodiment, a specification such as the conventional ATA specification, for example, may be used as the first specification. The first host unit 113 may be implemented as an SoC or part of an SoC to perform a host function supporting the first specification.

The second control section 120 comprises, for example, an information control SoC that controls an automotive navigation system or the like. The second control section 120 includes a second processing control unit 121, a second host control unit 122, and a second host unit 123.

The second processing control unit 121 uses the shared section 130 to carry out predetermined processing such as information processing to provide automotive navigation functions.

The second host control unit 122 controls the second host unit 123. The second host control unit 122 may be implemented as, for example, driver software with which the second processing control unit 121 controls the second host unit 123. When the second host control unit 122 detects that another device is electrically connected to the same bus via the second host unit 123, it carries out predetermined repetitive communication with the other device, such as polling according to the serial ATA specification. The recording medium reader and bus conversion unit described below are polled in this way by the second host unit 123.

The second host unit 123 is an interface unit (host adapter) for connecting to a bus that supports a second specification. A specification such as the serial ATA specification, for example, may be used as the second specification. The second host unit 123 may be implemented as an SoC or part of an SoC to perform a host function supporting the second specification.

The shared section 130 includes a recording medium reader 131, a connection switch 132, a bus conversion unit 133, a power source 134, a power switch 135, a first bus 140 supporting the first specification, a second bus 142 supporting the second specification, and a third bus 141 supporting the first specification.

The recording medium reader 131 reads data recorded on a recording medium. The recording medium reader 131 in this embodiment is a device for reading recorded data from portable external recording media, e.g., from an optical disc such as a CD, DVD, or BD. The recording medium reader 131 uses signals conforming to the first specification to send the data to the connection switch 132.

The connection switch 132 is connected to the first and third buses 140, 141, through which it switchably connects the first and second host units 113, 123 to the recording medium reader 131. The connection switch 132 switches these connections according to connection control signals CCS received from the first and second control units 110, 120.

The first control section 110 accesses the recording medium reader 131 more frequently than the second control section 120. The second control section 120 accesses the recording medium reader 131 when necessary, but may normally access another recording medium or recording medium reader such as a hard disk drive (not shown).

The bus conversion unit 133 interconnects the second and third buses 142, 141, and converts between signals conforming to the second specification supported by the second control section 120 and signals conforming to the first specification supported by the recording medium reader 131. Specifically, the bus conversion unit 133 receives signals conforming to the second specification from the second control section 120 via the second bus 142, converts them to signals conforming to the first specification, and sends the converted signals to the connection switch 132 via the third bus 141. The bus conversion unit 133 also receives signals conforming to the first specification from the connection switch 132 via the third bus 141, converts them to signals conforming to the second specification, and sends the converted signals to the second control section 120 via the second bus 142.

The power source 134 supplies power to the bus conversion unit 133 and other components.

The power switch 135 switches the supply of power from the power source 134 to the bus conversion unit 133 on and off on command from the second control section 120. The power switch 135 includes a bus conversion control unit 136 and a power supply control unit 137.

The bus conversion control unit 136 controls the power supply control unit 137 in response to commands from the second control section 120.

On command from the bus conversion control unit 136, the power supply control unit 137 switches between supplying power from the power source 134 to the bus conversion unit 133 and shutting this supply of power off.

Next, the processing carried out when the connection to the recording medium reader 131 is switched between the first and second host units 113, 123 will be described with reference to the drawings.

First, the process carried out when an external recording medium is inserted into the recording medium reader 131 while the information processing device 100 is operating with the first host unit 113 connected to the recording medium reader 131 by the connection switch 132 will be described. In this state, the supply of power to the bus conversion unit 133 is shut off.

Figure 2:
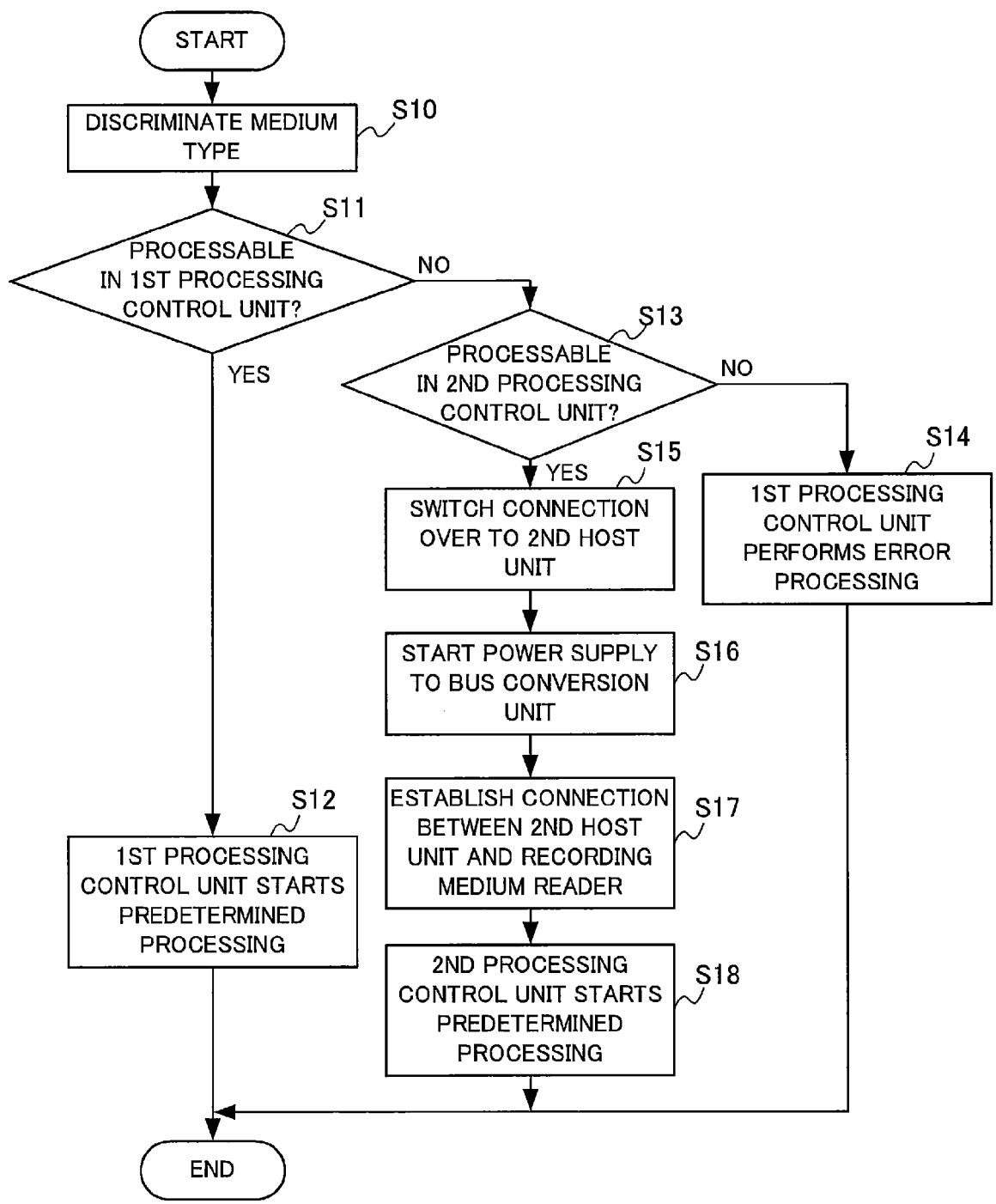
FIGS. 2 and 3 are flowcharts illustrating processing carried out when an external recording medium is inserted in the recording medium reader in FIG. 1.

Referring to FIG. 2, when the external recording medium is inserted in the recording medium reader 131, the first processing control unit 111 detects the insertion and discriminates the type of medium (S10).

Next, the first processing control unit 111 decides whether or not it can process the discriminated type of external recording medium (step S11). If the first processing control unit 111 decides that it can process the external recording medium (Yes in step S11), it proceeds to step S12; otherwise (No in step S11), it proceeds to step S13.

In step S12, the first processing control unit 111 initiates the predetermined processing mentioned above.

In step S13, the first processing control unit 111 decides whether or not the second processing control unit 121 can process the discriminated type of external recording medium. If the first processing control unit 111 decides that the second processing control unit 121 cannot process the external recording medium (No in step S13), it proceeds to step S14; otherwise it proceeds to step S15.

In step S14, since the discriminated type of external recording medium is not processable by either processing control unit, the first processing control unit 111 decides that the information processing device 100 cannot process the inserted external recording medium and carries out predetermined error processing.

In step S15, the first processing control unit 111 sends a connection control signal CCS to the connection switch 132 to command the connection switch 132 to switch the connection over to the second host unit 123. The connection switch 132 makes this switchover and sends a connection signal CS to the second processing control unit 121.

When the second processing control unit 121 receives the connection signal CS from the connection switch 132, it sends a power start signal PSS to the bus conversion control unit 136 to have the supply of power begin. When the bus conversion control unit 136 receives the PSS signal, it sends a power control signal PCS to the power supply control unit 137 to have the supply of power switched between the on and off states. The power supply control unit 137 responds by switching the supply of power to the bus conversion unit 133 on or off (step S16). In this example, since the supply of power to the bus conversion unit 133 is currently shut off, the power supply control unit 137 switches it on and starts supplying power to the bus conversion unit 133.

Next, the second host control unit 122 establishes a connection with the recording medium reader 131 via the second host unit 123 (step S17).

After the connection is established, the second processing control unit 121 reads information from the recording medium reader 131 and initiates the predetermined processing mentioned above (step S18).

The switching process in FIG. 2 takes place when the recording medium reader 131 is initially connected to the first host unit 113. Next, the switching process carried out when the recording medium reader 131 is initially connected to the second host unit 123 will be described with reference to the flowchart in FIG. 3.

Figure 3:
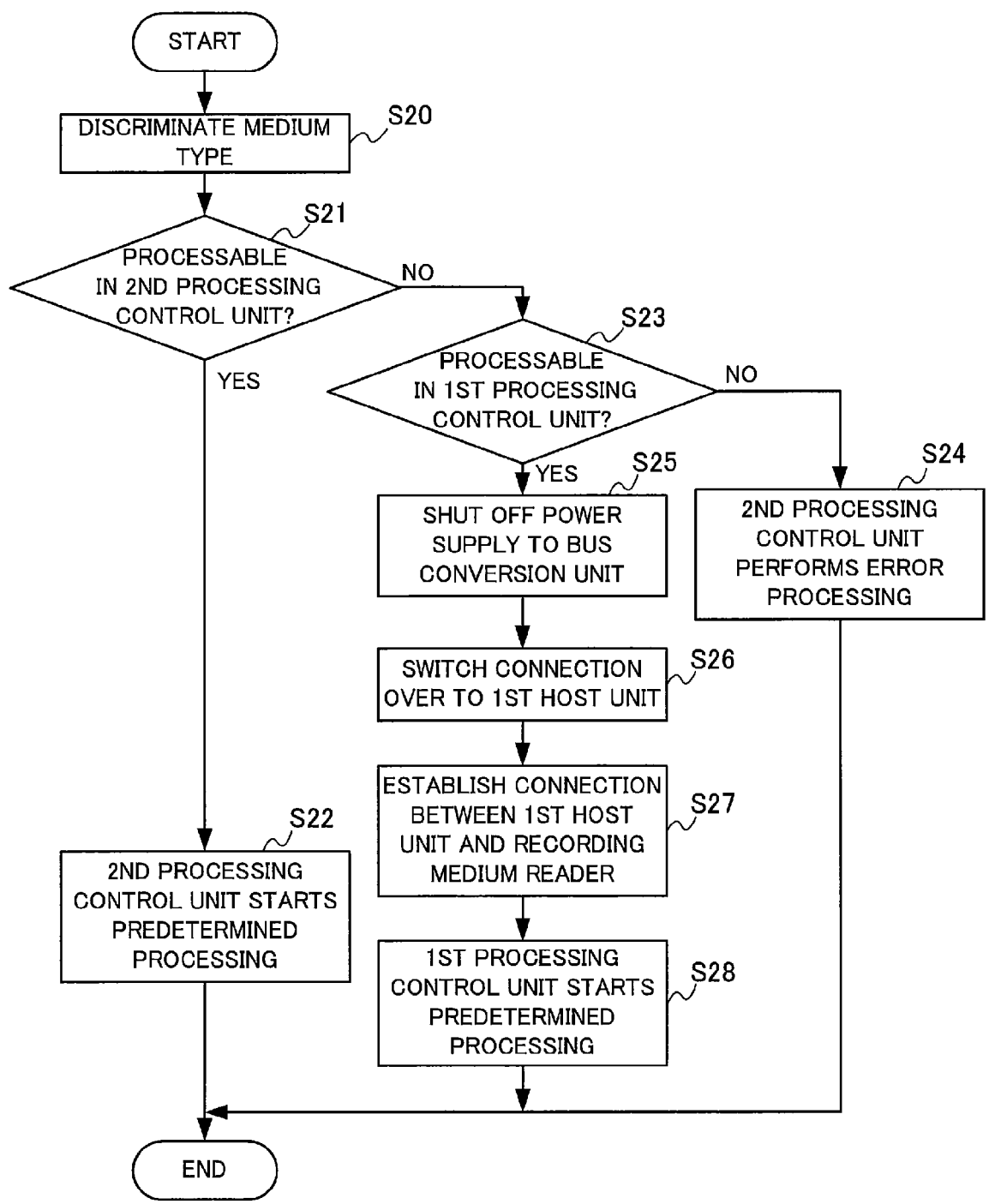

FIG. 3 illustrates the process carried out when an external recording medium is inserted in the recording medium reader 131 while the information processing device 100 is operating with the recording medium reader 131 connected to the second host unit 123 by the connection switch 132. In this state, power is supplied to the bus conversion unit 133.

When the external recording medium is inserted in the recording medium reader 131, the second processing control unit 121 detects the insertion and discriminates the type of the inserted external recording medium (step S20).

Next, the second processing control unit 121 decides whether or not it can process the discriminated type of external recording medium (step S21). If the second processing control unit 121 decides that it can process the external recording medium (Yes in step S21), it proceeds to step S22; otherwise (No in step S21), it proceeds to step S23.

In step S22, the second processing control unit 121 initiates the predetermined processing mentioned above.

In step S23, the second processing control unit 121 decides whether or not the first processing control unit 111 can process the discriminated type of external recording medium. If the second processing control unit 121 decides that the first processing control unit 111 cannot process the external recording medium (No in step S23), it proceeds to step S24; if it decides that the first processing control unit 111 can process the external recording medium (Yes in step S23), it proceeds to step S25.

In step S24, since the discriminated type of external recording medium is not processable by either processing control unit, the second processing control unit 121 decides that the information processing device 100 cannot process the inserted external recording medium and carries out predetermined error processing.

In step S25, the second processing control unit 121 sends the bus conversion control unit 136 a power end signal PES to command it to shut off the supply of power to the bus conversion unit 133. On receiving this command, the bus conversion control unit 136 sends a power control signal PCS to the power supply control unit 137 to have the supply of power switched on/off. The power supply control unit 137 responds by switching the supply of power to the bus conversion unit 133 on or off. In FIG. 3, since the power supply control unit 137 is currently supplying power to the bus conversion unit 133, it now switches to the off state and stops supplying power to the bus conversion unit 133.

The second processing control unit 121 also sends a connection control signal CCS to the connection switch 132 to command it to switch the connection over to the first host unit 113 (step S26). The connection switch 132 makes this switchover and sends a connection signal CS to the first processing control unit 111.

Next, the first host control unit 112 establishes a connection with the recording medium reader 131 via the first host unit 113 (step S27).

After the connection is established, the first processing control unit 111 reads information from the recording medium reader 131 and initiates the predetermined processing mentioned above (step S28).

If a relatively slow bus specification such as the conventional ATA specification is used as the first specification and a relatively fast bus specification such as the serial ATA specification is used as the second specification, the information processing device in the first embodiment can be manufactured at a relatively low cost. The reason is the insertion of the bus conversion unit 133 between the connection switch 132 and the second host unit 123. Because of this placement of the bus conversion unit 133, the length of the wiring in the relatively fast and therefore relatively expensive second bus 142 can be minimized, and the connection switch 132 only needs to be capable of handling signals sent and received on the relatively slow first and third buses 140, 141 that support the first specification. Thus a relatively inexpensive connection switch 132 can be used, and relatively inexpensive buses 140, 141 can be used for most of the bus wiring.

When the power supply control unit 137 shuts off power to the bus conversion unit 133, the second host control unit 122 recognizes that it is not electrically connected to the bus conversion unit 133 and recording medium reader 131, and does not attempt to establish a connection with the recording medium reader 131 or bus conversion unit 133 by carrying out polling or other unnecessary communication. This prevents wasteful use of resources by the second control section 120.

In addition, since the bus conversion control unit 136 controls the bus conversion unit 133 instead of controlling the second host unit 123, if the second host unit 123 is connected to another recording medium or recording medium reader such as a hard disk drive, the operation of the bus conversion control unit 136 does not affect normal access to the other recording medium or recording medium reader.

Possible variations of the first embodiment include the following.

In step S16 in FIG. 2 and step S25 in FIG. 3, the bus conversion control unit 136 operates in response to commands from the second processing control unit 121. Alternatively, the bus conversion control unit 136 may operate autonomously by monitoring the state of the connection switch 132 and detecting the bus switching carried out by the connection switch 132. Specifically, when the connection switch 132 changes over to connect to the first host unit 113, the bus conversion control unit 136 detects the change and commands the power supply control unit 137 to shut off power to the bus conversion unit 133. This variation can simplify the processing in the second processing control unit 121.

The decisions in steps S11 and S13 in FIG. 2 need not both be made by the first processing control unit 111. When the first processing control unit 111 decides that it cannot process the discriminated type of medium in step S11, it may proceed directly to step S15, and after the connection between the recording medium reader 131 and second host unit 123 is established in step S17, the second processing control unit 121 may make the decision in step S13 and proceed to step S14 or S18 depending on the result. A similar variation of the processing flow in FIG. 3 may be used to switch the connection from the second host unit 123 to the first host unit 113. Carrying the processing out in this sequence eliminates the need for one processing control unit to know whether the other processing control unit can process the external recording medium.

In steps S11 and S13 in FIG. 2, the processability of the external recording medium is determined by the first processing control unit 111 by discriminating the type of external recording medium inserted in the recording medium reader 131. Alternatively, when the external recording medium is inserted in the recording medium reader 131, the first processing control unit 111 may query the user and switch the connection from the first processing control section 110 to the second processing control section 120 if the user gives permission. A similar user query may be made in switching the connection from the second processing control section 120 to the first processing control section 110. When an external recording medium can be processed by both the first and second processing control sections 110, 120, this variation allows the user to decide which processing control section to use.

The recording medium reader 131 is described above as a device that reads information from an external recording medium, but a device that reads information from a built-in recording medium may be used. In this case, for example, in steps S11 and S13 in FIG. 2 and steps S21 and S23 in FIG. 3, the first and second processing control units 111, 121 may determine whether or not they can process the recording medium from the type of information recorded on the recording medium: for example, by examining the filename extension of the information.

The first control section 110 may include a plurality of first host units 113. Similarly, the second control section 120 may include a plurality of second host units 123.

In the first embodiment, the first host unit 113 may also be able to access an internal memory medium reader (not shown) connected to the first bus 140, and the second host unit 123 may also be able to access an internal recording medium reader (not shown) connected to the second bus 142.

In the first embodiment, communication between the second host unit 123 and the bus conversion unit 133 is interrupted by shutting off power to the bus conversion unit 133, but other methods may be used. For example, the bus conversion unit 133 may be configured so that it can switch its connection to the second bus 142 on and off, and the second processing control unit 121 may issue on/off commands directly to the bus conversion unit 133. Upon receiving an off command from the second processing control unit 121, the bus conversion unit 133 disconnects itself from the second bus 142; upon receiving an on command from the second processing control unit 121, the bus conversion unit 133 connects itself to the second bus 142. In this variation, the power switch 135 is unnecessary.

Second Embodiment

Figure 4:
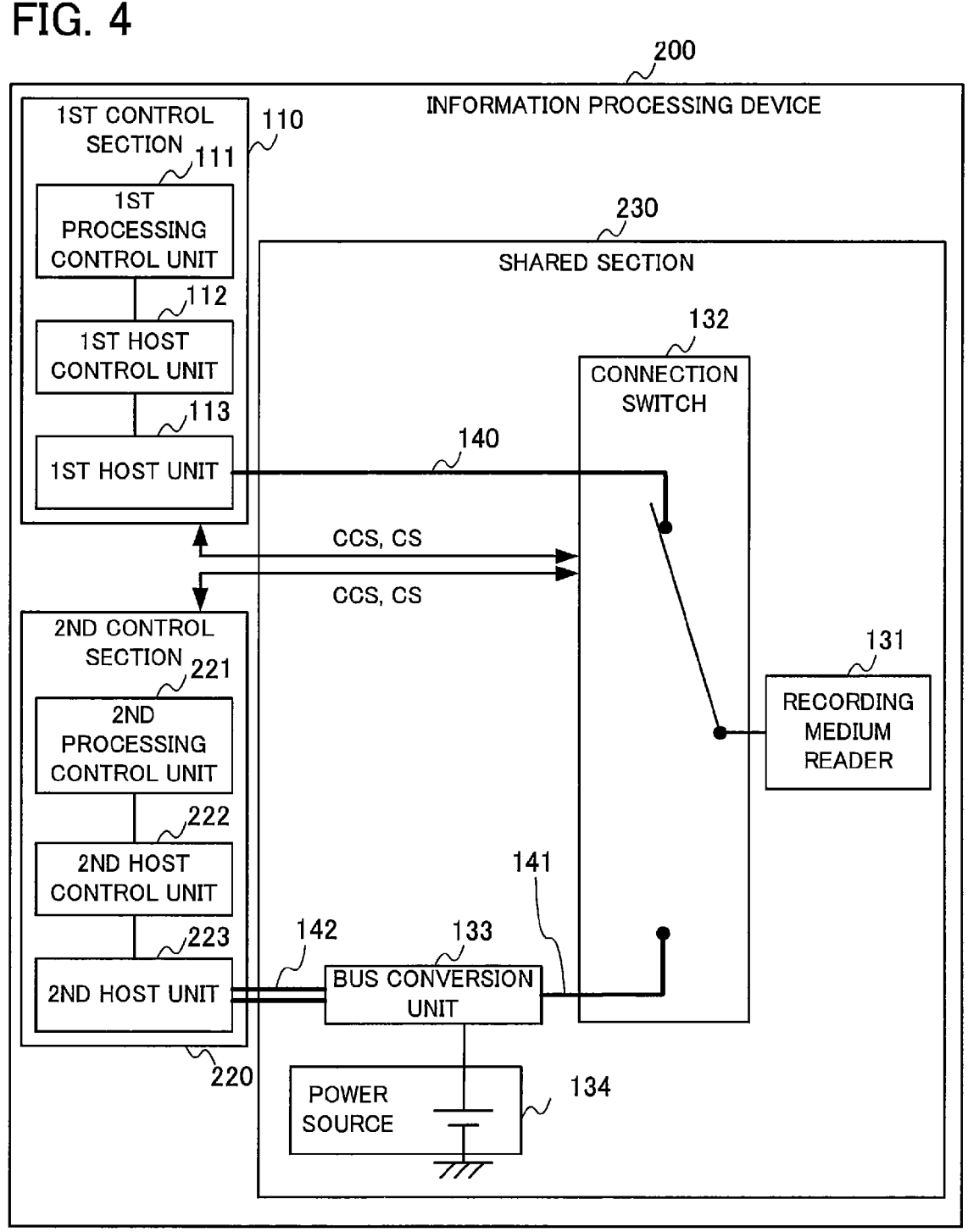
FIG. 4 is a block diagram schematically showing the structure of an information processing device according to a second embodiment of the invention.

Referring to FIG. 4, the information processing device 200 in the first embodiment includes a first control section 110, a second control section 220, and a shared section 230. The information processing device 200 in the second embodiment differs from the information processing device 100 in the first embodiment in the configuration and functions of the second control section 220 and the shared section 230.

The first embodiment uses a bus conversion control unit 136 and power supply control unit 137 to control the supply of power to the bus conversion unit 133, thereby enabling the second host unit 123 to recognize that the second bus is not in use and avoid unnecessary connection establishment processing. In the second embodiment, the same effect is obtained by control of the second host unit 223, without using a bus conversion control unit 136 and power supply control unit 137.

The second control section 220 carries out predetermined processing such as automotive navigation processing. The second control section 220 comprises, for example an information control SoC that controls an automotive navigation system or the like. The second control section 220 includes a second processing control unit 221, a second host control unit 222, and a second host unit 223.

The second processing control unit 221 carries out the same processing as in the first embodiment and in addition, when it receives a connection signal CS from the connection switch 132, it carries out processing for enabling the second host unit 223. Enabling the second host unit 223 means, for example, loading driver software to implement the second host control unit 222 and allow the second host control unit 222 to start controlling the second host unit 223, thereby making the second host unit 223 in a state to be able to communicate with the second bus 142.

When the second processing control unit 221 commands the connection switch 132 to switch the connection from the second host unit 223 to the first host unit 113, the second processing control unit 221 disables the second host unit 223. Disabling the second host unit 223 means, for example, unloading the driver software for implementing the second host control unit 222, thereby terminating control of the second host unit 223 by the second host control unit 222 and preventing the second host unit 223 from communicating with the second bus 142.

The second host control unit 222 controls the second host unit 223. In the second embodiment, the second host control unit 222 is loaded and unloaded by the second processing control unit 221.

The second host unit 223 is an interface unit (host adapter) for connecting to a bus that supports the second specification. The second host unit 223 is enabled when driver software is loaded to implement the second host control unit 222 and is disabled when the driver software is unloaded.

The shared section 230 includes the recording medium reader 131, connection switch 132, bus conversion unit 133, and power source 134 included in the shared section 130 in the first embodiment, but differs from the first embodiment by not including a bus conversion control unit 136 and power supply control unit 137.

The process carried out when an external recording medium is inserted in the recording medium reader 131 while the recording medium reader 131 is connected to the first host unit 113 will now be described with reference to the flowchart in FIG. 5.

Figure 5:
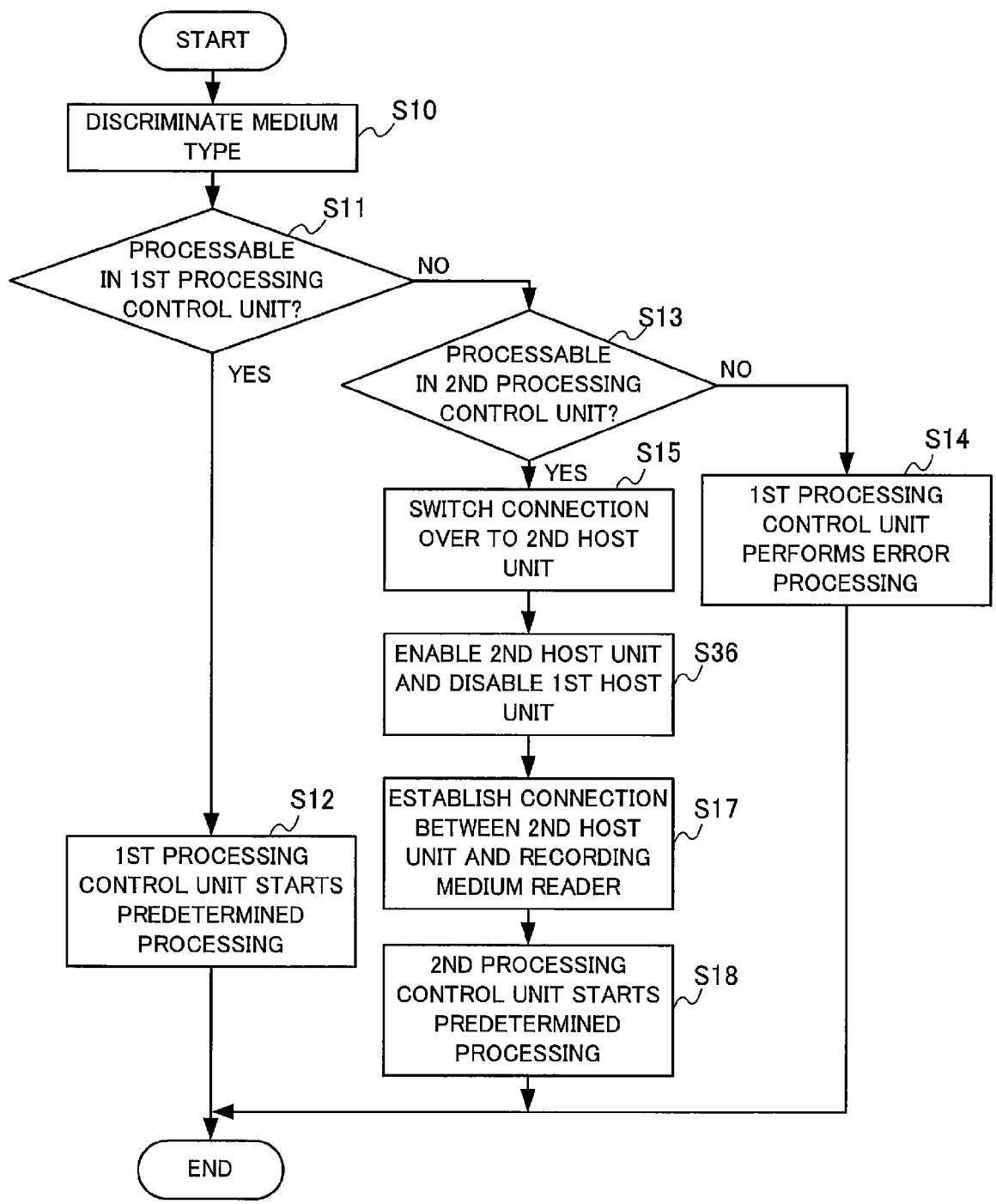
FIGS. 5 and 6 are flowcharts illustrating processing carried out when an external recording medium is inserted in the recording medium reader in FIG. 4.

The processing from steps S10 to S15 in FIG. 5 is the same as in steps S10 to S15 in FIG. 2.

In step S15, the first processing control unit 111 sends a connection control signal CCS to the connection switch 132. The connection switch 132 disconnects the first bus 140, connects the third bus 141, and sends a connection signal CS to the second processing control unit 221.

When the second processing control unit 221 receives the connection signal CS from the connection switch 132, it enables the second host unit 223 (step S36). If necessary, the first processing control unit 111 also disables the first host unit 113 at this time by unloading driver software that implements the first host control unit 112, thereby disconnecting the first host unit 113 from the first bus 140.

The processing in steps S17 and S18 is the same as the processing in steps S17 and S18 in FIG. 2.

Next, the switching process carried out when an external medium is inserted in the recording medium reader 131 while the recording medium reader 131 is connected to the second host unit 223 will be described with reference to the flowchart in FIG. 6.

Figure 6:
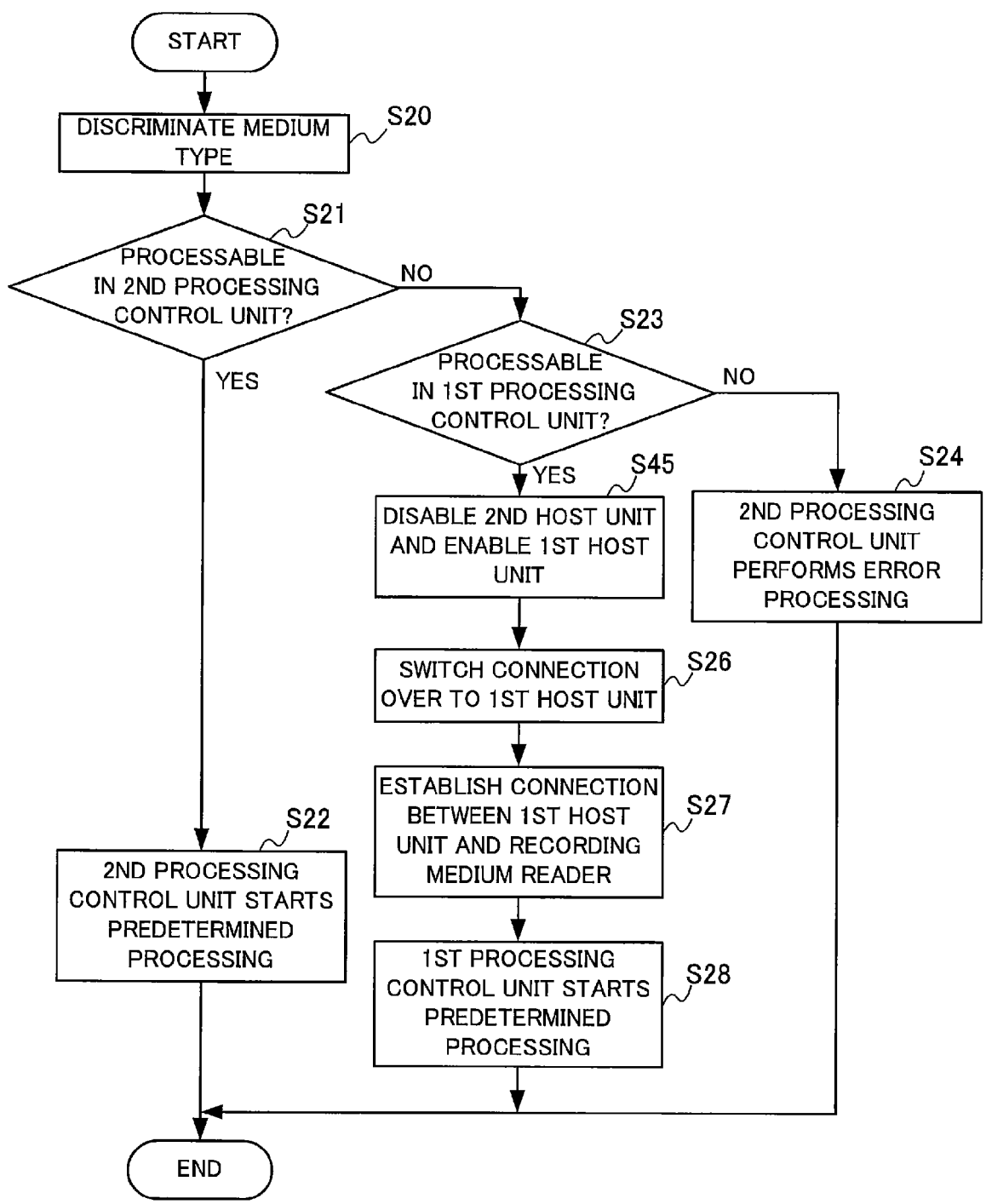

The processing in steps S20 to S24 in FIG. 6 is the same as in steps S20 to S24 in FIG. 2.

When the second processing control unit 221 decides that it cannot process the external recording medium (No in step S21) but that the first processing control unit 111 can do so (Yes in step S23), it proceeds from step S23 to step S45.

In step S45, the second processing control unit 221 disables the second host unit 223.

The second processing control unit 221 then sends a connection control signal CCS to the connection switch 132 to command it to switch the connection over to the first host unit 113 (step S26). The connection switch 132 makes this switchover and sends a connection signal CS to the first processing control unit 111.

Next, the first host unit 113 establishes a connection with the recording medium reader 131 (step S27). If necessary, the first processing control unit 111 enables the first host unit 113 at this time by loading driver software to implement the first host control unit 112, thereby enabling the first host unit 113 to communicate on the first bus 140.

After the connection is established by the first host unit 113, the first processing control unit 111 reads information from the recording medium reader 131 and initiates the predetermined processing mentioned above (step S28).

As described above, when the second host unit 223 is not connected to the recording medium reader 131, the second host unit 223 is disabled and accordingly does not communicate with the second bus 142, so the same effect is achieved as by shutting off the power supply to the bus conversion unit 133 in the first embodiment.

In a variation of the second embodiment, the recording medium reader 131 reads information from a built-in recording medium instead of an external recording medium.

In another variation, the second host unit 223 is enabled and disabled by loading and unloading control software or application software instead of by loading and unloading driver software as in the description above.

In the first and second embodiments, exemplary procedures for switching bus connections when an external recording medium is inserted in a recording medium reader 131 were described. In other embodiments, the connections between the first and second control sections 110, 120, 220 are switched according to commands input by the user via an input section (not shown). In these embodiments, according to the input command, it is determined whether the first control section 110 or the second control section 120 or 220 is to carry out the processing to access the inserted recording medium.

The information processing devices 100 and 200 described in the first and second embodiments and the variations thereof are not limited to use in devices including automotive navigation systems and optical disc drives. Applications involving video reproducing devices, video recording/reproducing devices, audio reproducing devices, an audio recording/reproducing devices, personal computers, and so on are also contemplated.

Those skilled in the art will recognize that further variations are possible within the scope of the invention, which is defined in the appended claims.

What is claimed is:
1. An information processing device comprising:
a first bus supporting a first specification;
a second bus supporting a second specification;
a third bus supporting the first specification;
a reader unit for reading information from a recording medium;
a connection switch through which the first bus and the third bus are switchably connected to the reader unit;
a first control section for communicating with the reader unit through the first bus and the connection switch;
a conversion unit through which the second bus is connected to the third bus, for converting incoming signals conforming to the first specification, obtained from the third bus, to outgoing signals conforming to the second specification and sending the outgoing signals conforming to the second specification on the second bus, and converting incoming signals conforming to the second specification, obtained from the second bus, to outgoing signals conforming to the first specification, and sending the outgoing signals conforming to the first specification on the third bus; and
a second control section for communicating with the reader unit through the second bus, the conversion unit, the third bus, and the connection switch; wherein when the first bus is connected to the reader unit through the connection switch, the second control section halts communication with the conversion unit.

2. The information processing device of claim 1, wherein the second specification permits higher-speed communication than the first specification.

3. The information processing device of claim 2, wherein the first specification is an advanced technology attachment specification and the second specification is a serial advanced technology attachment specification.

4. The information processing device of claim 1, further comprising:

a power source for supplying power to the conversion unit; and a power switching unit for switching supply of power from the power source to the conversion unit on and off in response to commands from the second control section;

wherein the second control section halts communication with the conversion unit by commanding the power switching unit to switch off the supply of power from the power source to the conversion unit.

5. The information processing device of claim 1, wherein the second control section further comprises a host unit connected to the second bus, and the second control section halts communication with the conversion unit by disabling the host unit.

6. The information processing device of claim 5, wherein the second control section further comprises a host control unit for controlling the host unit, and the second control section disables the host unit by terminating control of the host unit by the host control unit.

7. The information processing device of claim 6, wherein the second control section terminates control of the host unit by unloading the host control unit.

8. An information processing method employing a first control section connected to a first bus supporting a first specification and a second control section connected to a second bus supporting a second specification, the information processing method comprising:

switchably connecting the first bus and a third bus to a reader unit for reading information from a recording medium, the third bus supporting the first specification;

interconnecting the second bus and the third bus through a conversion unit for converting between signals confirming to the first specification and signals conforming to the second specification;

using the first control section to communicate with the reader unit via the first bus when the first bus is connected to the reader unit;

using the second control section to communicate with the reader unit via the second bus, the conversion unit, and the third bus when the third bus is connected to the reader unit; and halting communication between the second control section and the conversion unit when the first bus is connected to the reader unit.

9. The information processing method of claim 8, wherein the second specification permits higher-speed communication than the first specification.

10. The information processing method of claim 9, wherein the first specification is an advanced technology attachment specification and the second specification is a serial advanced technology attachment specification.

11. The information processing method of claim 8, wherein halting communication between the second control section and the conversion unit further comprises shutting off a supply of power from a power source to the conversion unit.

12. The information processing method of claim 8, wherein the second control section includes a host unit by which the second control section is connected to the second bus, and halting communication between the second control section and the conversion unit further comprises disabling the host unit.

13. The information processing method of claim 12, wherein the second control section also includes a host control unit for controlling the host unit, and disabling the host unit further comprises terminating control of the host unit by the host control unit.

14. The information processing method of claim 13, wherein terminating control of the host unit further comprises unloading the host control unit.

* * * * *